US010313335B2

(12) United States Patent
Mardikar et al.

(10) Patent No.: US 10,313,335 B2
(45) Date of Patent: *Jun. 4, 2019

(54) SERVER AND/OR CLIENT DEVICE AUTHENTICATION

(71) Applicant: PAYPAL, INC., San Jose, CA (US)

(72) Inventors: Upendra Mardikar, San Jose, CA (US); Kent Griffin, Mountain View, CA (US); Allison Elizabeth Miller, Mountain View, CA (US); Amol Patel, Los Altos, CA (US)

(73) Assignee: PAYPAL, INC., SAN JOSE, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/858,227

(22) Filed: Dec. 29, 2017

(65) Prior Publication Data

US 2018/0145974 A1 May 24, 2018

Related U.S. Application Data

(63) Continuation of application No. 14/887,219, filed on Oct. 19, 2015, now Pat. No. 9,860,244, which is a (Continued)

(51) Int. Cl.
*H04L 21/00* (2006.01)
*H04L 29/06* (2006.01)
(Continued)

(52) U.S. Cl.
CPC ........ *H04L 63/0846* (2013.01); *H04L 9/3228* (2013.01); *H04L 63/083* (2013.01);
(Continued)

(58) Field of Classification Search
CPC .................................................. H04L 63/083
See application file for complete search history.

(56) References Cited

U.S. PATENT DOCUMENTS 5,907,621 A * 5/1999 Bachman ............. G06Q 20/382
  705/64
7,614,078 B1   11/2009 Stieglitz
  (Continued)

FOREIGN PATENT DOCUMENTS

JP       2005209083       8/2005

OTHER PUBLICATIONS

Long et al., "Manageable One-Time Password for Consumer Applications", Consumer Electronics, 2007. ICCE 2007. Digest of Technical Papers. International Conference on, Date of Conference: Jan. 10-14, 2007, pp. 2.

*Primary Examiner* — Morshed Mehedi
(74) *Attorney, Agent, or Firm* — Haynes and Boone, LLP

(57) ABSTRACT

Embodiments of systems and methods for client and/or server authentication are provided. In one embodiment, a method includes sending information from a mobile network device to a server, wherein the information comprises a seed that is used by both the mobile network device and the server to compute a series of one time passwords. The method also includes receiving, by the mobile network device, a succession of one time passwords generated by the server throughout a session. And the method further includes comparing the received one time passwords generated by the server throughout the session to corresponding one time passwords generated at the mobile network device. In this manner, the server can be authenticated. In various embodiments, the process may be reversed to facilitate client, e.g., mobile network device, authentication.

20 Claims, 5 Drawing Sheets

Related U.S. Application Data continuation of application No. 14/175,115, filed on Feb. 7, 2014, now Pat. No. 9,197,634, which is a continuation of application No. 13/782,919, filed on Mar. 1, 2013, now Pat. No. 8,656,459, which is a continuation of application No. 11/966,800, filed on Dec. 28, 2007, now Pat. No. 8,424,057.

(51) Int. Cl.
    *H04W 12/06*     (2009.01)
    *H04W 12/12*     (2009.01)
    *H04L 9/32*     (2006.01)

(52) U.S. Cl.
    CPC ...... *H04L 63/0838* (2013.01); *H04L 63/1466* (2013.01); *H04L 63/1483* (2013.01); *H04W 12/06* (2013.01); *H04W 12/12* (2013.01); *H04L 63/0876* (2013.01); *H04L 2209/80* (2013.01)

(56) References Cited

U.S. PATENT DOCUMENTS

| | | |
|---|---|---|
| 7,979,707 B2 | 7/2011 | Röstin et al. |
| 7,984,491 B2 | 7/2011 | Ueda et al. |
| 8,160,244 B2 | 4/2012 | Buer |
| 2002/0002678 A1 | 1/2002 | Chow et al. |
| 2003/0061516 A1 | 3/2003 | Yamaguchi et al. |
| 2003/0225890 A1 | 12/2003 | Dunstan et al. |
| 2005/0198534 A1 | 9/2005 | Matta et al. |
| 2005/0283444 A1 | 12/2005 | Ekberg |
| 2005/0283619 A1 | 12/2005 | Min |
| 2006/0002556 A1 | 1/2006 | Paul |
| 2006/0229998 A1 | 10/2006 | Harrison et al. |
| 2006/0235795 A1 | 10/2006 | Johnson et al. |
| 2006/0265340 A1 | 11/2006 | Ziv et al. |
| 2007/0011104 A1 | 1/2007 | Leger et al. |
| 2007/0033642 A1 | 2/2007 | Ganesan et al. |
| 2007/0067828 A1 | 3/2007 | Bychkov |
| 2007/0077916 A1 | 4/2007 | Saito |
| 2007/0118745 A1 | 5/2007 | Buer |
| 2007/0174614 A1 | 7/2007 | Duane et al. |
| 2007/0174630 A1 | 7/2007 | Shannon et al. |
| 2007/0220594 A1 | 9/2007 | Tulsyan |
| 2007/0226784 A1 | 9/2007 | Ueda et al. |
| 2007/0277224 A1 | 11/2007 | Osborn et al. |
| 2008/0010673 A1 | 1/2008 | Makino et al. |
| 2008/0034216 A1 | 2/2008 | Law |
| 2008/0104684 A1 | 5/2008 | Lunde et al. |
| 2008/0320306 A1 | 12/2008 | Yamamura |
| 2009/0104888 A1 | 4/2009 | Cox |
| 2009/0165099 A1 | 6/2009 | Eldar et al. |
| 2009/0249492 A1 | 10/2009 | Sorensen |
| 2009/0328165 A1 | 12/2009 | Cook et al. |
| 2010/0031334 A1 | 2/2010 | Shaikh |
| 2010/0131764 A1 | 5/2010 | Goh |

\* cited by examiner

SERVER AND/OR CLIENT DEVICE AUTHENTICATION

RELATED APPLICATIONS

This application is a continuation of Ser. No. 14/887,219, filed Oct. 19, 2015, which is a continuation of Ser. No. 14/175,115, filed Feb. 7, 2014, now U.S. Pat. No. 9,197,634, which is a continuation of Ser. No. 13/782,919, filed Mar. 1, 2013, now U.S. Pat. No. 8,656,459, which is a continuation of Ser. No. 11/966,800, filed on Dec. 28, 2007, now U.S. Pat. No. 8,424,057, all of which are incorporated herein by reference in their entirety.

TECHNICAL FIELD

The present invention relates generally to computer networking. The present invention relates more particularly to an apparatus and method for inhibiting phishing on mobile network devices, such as cellular telephones.

BACKGROUND

The use of cellular telephones and the like for accessing the Internet is becoming increasing popular. As wireless data transmission rates continue to increase, the practicality of accessing web pages via such device improves.

The web pages accessed by such mobile network devices as cellular telephones can be referred to mobile web pages. Mobile web pages typically display less content as compared to their regular web page counterparts. This reduction in content is due in part to bandwidth constraints and in part to the size of mobile displays.

One of the items commonly omitted from mobile web pages is a listing of the universal resource locator (URL) for the mobile web page presently being viewed. Listing the URL of a web page presently being viewed is one way that users can prevent phishing.

Phishing is an illegitimate and often illegal attempt to obtain private or sensitive information by deception over the Internet. For example, phishing can be used to obtain user names, account numbers, and passwords for bank accounts, brokerage accounts, and the like. This deception can occur by providing a fake web page that appears to be a legitimate web page. Users, who believe that the web page is its legitimate counterpart, provide sensitive information to the web page.

For example, users may receive an email stating that they need to contact their bank. The email can provide a link to the bank's website. Users that then contact the bank using the link provided in the email are connected to a fake website for the bank instead of the official website for the bank. The fake website may look just as legitimate as the bank's official website. The only apparent difference is the URL. If the user doesn't notice the incorrect URL or if the URL is not displayed, then the user may enter sensitive information into a form that is displayed on the fake web page.

The web pages of banks, brokerage firms, and the like typically require that a user enter a user name, account number, and password into a form to gain further access to the website. Entering this information into the form of a fake web page provides this information to the person responsible for the phishing.

As a further example, a user may visit a fraudulent merchant's website. This fraudulent website may allow the user to click on a link to a website for PayPal® or Google Checkout®. However, rather than taking the user to the legitimate PayPal® or Google Checkout® website, the link on the fraudulent merchant's website takes the user to a fake PayPal® or Google Checkout® website. At the fake PayPal® or Google Checkout® website, the user may enter sensitive information into a form that is displayed there, as discussed above.

Mobile network devices, such as cellular telephones, are particularly susceptible to such deception because the URL is often not displayed as mentioned above. If the URL is displayed, such as is done on a desktop computer, the user can verify that the URL is correct for the web page being displayed. However, since the URL is often not displayed on cellular telephone when visiting a website, the cellular telephone user may not have an opportunity to verify that the URL is correct. The cellular telephone user is thus undesirably vulnerable to phishing.

Thus, although such cellular telephones have proven generally suitable for their intended purposes, they possess inherent deficiencies which detract from their overall effectiveness and desirability. Therefore, it is desirable to provide an apparatus and method for inhibiting phishing on mobile network devices, such as cellular telephones.

BRIEF SUMMARY

A method and system for inhibiting phishing is disclosed. According to an example of an embodiment, the method can comprise sending information from a mobile network device to a website server, generating a one time password at the mobile network device from the information, generating a one time password at the website server from the information, sending the one time password generated at the website server to the mobile network device when the mobile network device subsequently accesses the website, and comparing the one time password generated at the website server to the one time password generated at the mobile network device.

In this manner, the website can be authenticated. That is, it can be determined that the website actually being accessed is the website that is intended to be accessed. Only the website that is intended to be accessed will have the ability to generate a one time password that is the same as the one generated by the mobile network device.

According to an example of an embodiment, the process described above can be reversed so as to facilitate client, e.g., mobile network device, authentication. Thus, a method for client authentication can comprise sending information from a website server to a mobile network device, generating a one time password at the website server from the information, generating a one time password at the mobile network device from the information, sending the one time password generated at the mobile network device to the website server when the mobile network device subsequently accesses the website, and comparing the one time password generated at the mobile network device to the one time password generated at the website server so as to authenticate the mobile network device.

According to an example of an embodiment, a mobile network device can comprising a processor that is configured to send information from the mobile network device to a website server, generate a one time password from the information, receive a one time password generated at the website server when the mobile network device accesses the website server, and compare the one time password generated at the website server to the one time password generated at the mobile network device.

According to an example of an embodiment, a website server can comprise a processor configured to receive information from a mobile network device generate a one time password from the information, and send the one time password to the mobile network device when the mobile network device accesses the website.

Benefits include the mitigation of phishing when visiting website on the Internet.

This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

A method and system for mitigating phishing are disclosed. Information can be exchanged between a mobile network device, such as a cellular telephone, and a website server. This can be done during an initial contact between the mobile network device and the website server. This information can define an initial seed that is used by both the mobile network device and the website server to separately compute an identical series of one time passwords. Each time that the mobile network device contacts the website server, the website server sends the most recent one time password to the mobile network device. The mobile network device can then compare this one time password to a one time password computed by the mobile network device to authenticate the website server.

The website can continue to periodically generate one time passwords and send them to the mobile networking device throughout the session. The mobile network device can continue to generate corresponding one time passwords and compare them to the one time passwords provided by the website, so as to maintain the integrity of the connection. For example, the website can periodically generate one time passwords and send them to the mobile networking device approximately every 1, 5, 10, 30, or 60 seconds.

According to one example of an embodiment, the initial seeding of the one time password computation software can be done by having a user log onto a website with a mobile network device. The mobile network device registers with the website. The website then sends a wireless application protocol (WAP) push with cookie information to the mobile network device.

According to one example of an embodiment, the initial seeding of the one time password computation software can be done by having the user visit the website using an unregistered mobile network device. The user then enters a user name and password for the first time. The website sets a cookie to facilitate identification of the mobile network device the next time that the mobile network device contacts the website.

Examples of embodiments are discussed in further detail with reference to the figures below.

Figure 1:
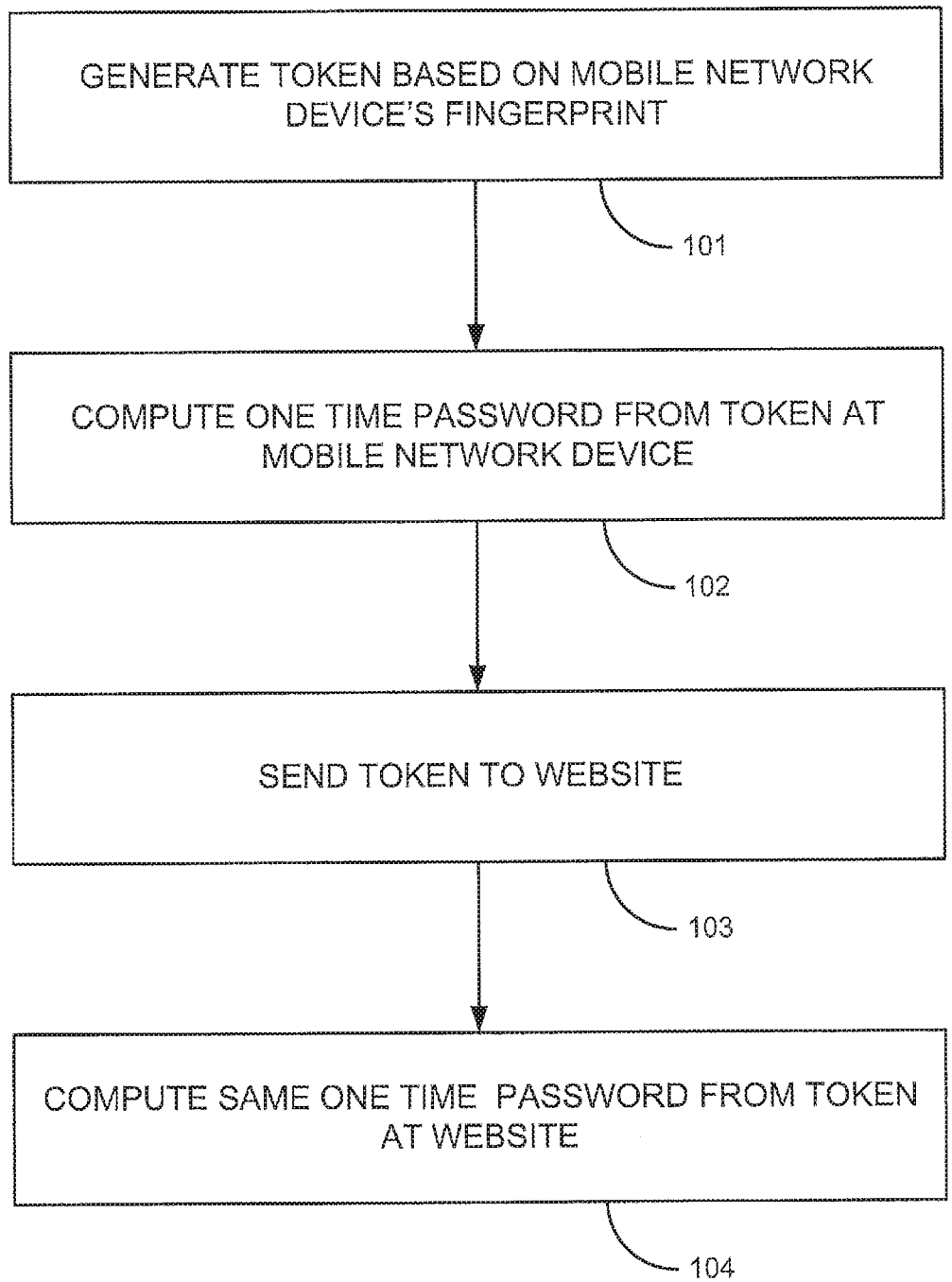
FIG. 1 is a flowchart showing the computation of one time passwords by the mobile network device and the website for use in authenticating the website so as to mitigate phishing according to an example of an embodiment of the present invention.

Referring now to FIG. 1, an example of an embodiment of a system for mitigating phishing comprises the use of one time password (OTP) or certificate based software and/or hardware. Equivalent one time password computation systems must be used by both the mobile network device and the website server. That is, both the mobile network device and the website server must be capable of computing the same one time password when given the same seed. Of course, this can be accomplished if both the mobile network device and the website server use identical one time password computation algorithms. It may also be accomplished via the use of different, but equivalent, algorithms.

As shown in FIG. 1, identical one time passwords are computer in both the mobile network device and the website server. These passwords can then be used to authenticate the website when the mobile network device accesses the website.

More particularly, a token can be generated based upon a fingerprint of the mobile network device, as indicated in block 101. The fingerprint can use information from the mobile network device. The fingerprint can use information that is unique to the mobile network device. For example, the fingerprint can use information regarding one or more cookies that are present in the mobile network device, hypertext transfer protocol (HTTP) header information that is present in the mobile network device, and/or information that is manually entered by the user. The HTTP can, for example, include the telephone number of the mobile network device. Similarly, manually entered information can include the telephone number of the mobile network device. The fingerprint can be any information that is representative of or related to the mobile network device. The information can be transformed or manipulated in any desired manner. Indeed, the information itself can be the fingerprint. The data size of the fingerprint can be larger, smaller, or the same as the data size of the information from which the fingerprint is generated.

A token can be generated from the fingerprint. The token can be formed by any desired means. For example, the token can be generated by encrypting the fingerprint. As a further example, the token can be generated by forming a hash, such as a one way hash, from the fingerprint. The token can be any information that is represented of or related to the fingerprint. Indeed, the fingerprint or the information from which the fingerprint is generated can be the token. The data size of the token can be larger, smaller, or the same as the data size of the information from which the token is generated.

A token can be distributed to the mobile device. The token can be either a software token or a hardware token. The token can either include or not include information derived from the mobile device (such as fingerprint information).

A token can be unique to a particular mobile network device. Such uniqueness can be achieved by making the token dependent upon one or more unique characteristics of the mobile network device. For example, the token can depend upon the telephone number of the mobile network device.

A token can encapsulate a one time password. Thus, a token can either contain a one time password itself or can contain information that is used to generate a one time password. For example, a token can comprise a random number sequence that can be used, either alone or along with other information, as a seed for use in generating a one time password.

A one time password is computed from the token at the mobile device, as indicated in block 102. This one time password will be compared to a one time password computed by the web sited server to authenticate the website, as discussed below. This onetime password can be computed immediately after the token is generated or upon a subsequent connection to the website at which time authentication of the website is desired.

The token is sent from the mobile network device to the website, as indicated in block 103. If the token was distributed to the mobile network device, the token does not need to be sent from the mobile network device to the website. The token is used by the website server to compute a one time password, as indicated in block 104. The same algorithm for computing one time passwords can be used by both the mobile network device and the website server. Thus, since both the mobile network device and the website server are using the same seed, e.g., the token, to compute the one time passwords, the one time password computed by the mobile network device will be identical to the one time password computed by the website server.

Figure 2:
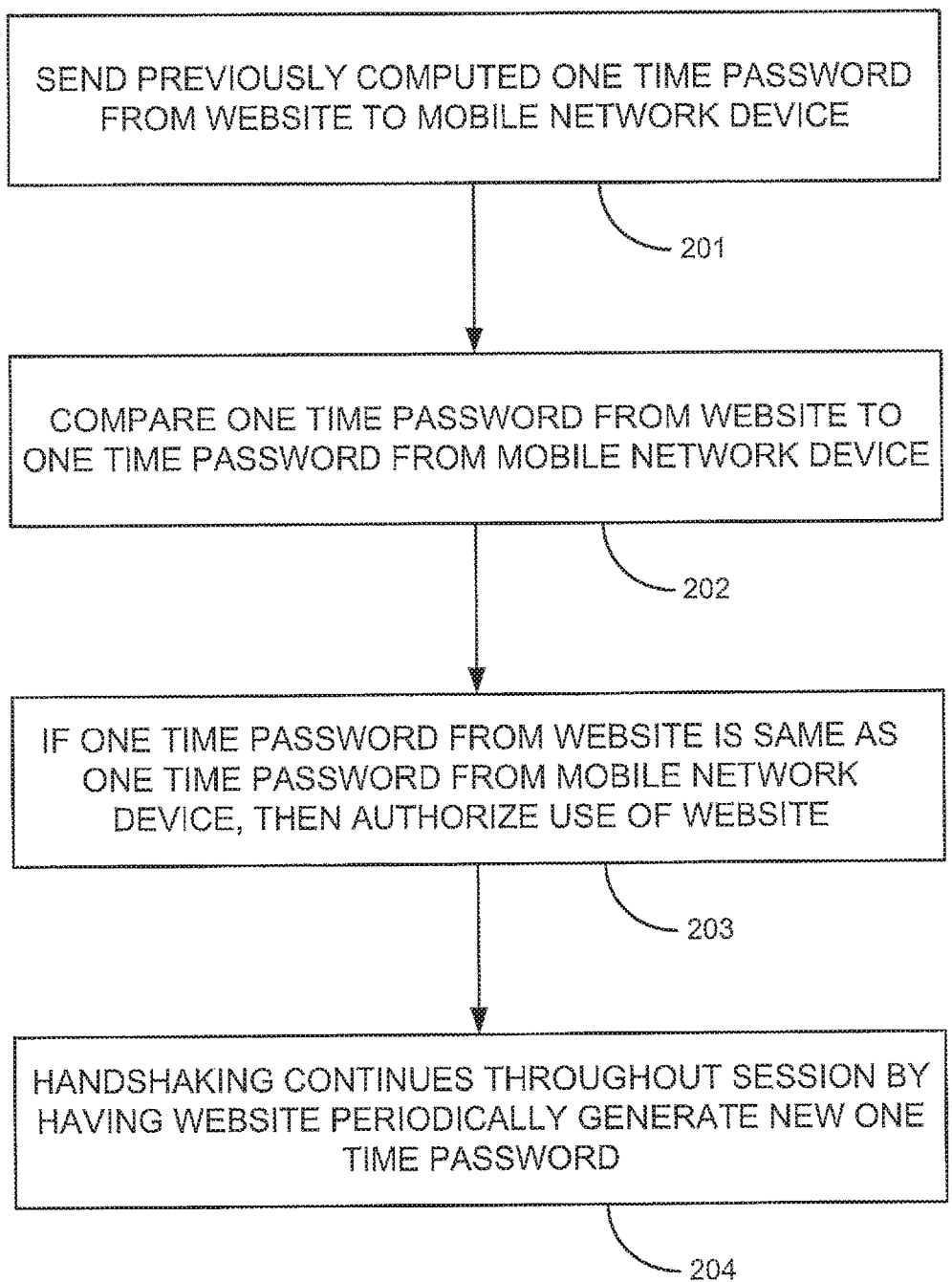
FIG. 2 is a flowchart showing use of the one time passwords of FIG. 1 to authenticate the website according to an example of an embodiment of the present invention.

Referring now to FIG. 2, the authentication process is shown according to an example of an embodiment. When a mobile network device accesses a website, then a one time password is sent from the website to the mobile network device, as indicated in block 201. This one time password is computed from the seed provided by the mobile network device as discussed above. The same one time password has been computed by the mobile network device, as also discussed above.

The one time password from the website is compared to the one time password of the mobile network device, as indicated in block 202. If the one time password from the website is the same as the one time password of the mobile network device, then use of the website can be authorized, as indicated in block 203.

Handshaking between the mobile network device and the website can continue throughout the session, as indicated in block 204. Such handshaking can comprise the periodic generation of the next one time password by the website and communication of that new one time password to the mobile network device. Each password received by the mobile network device can be compared to a password generated by the mobile network device.

As long the one time passwords in the series thereof that is generated by the website server continue to match the onetime passwords generated by the mobile network device, then the website can be considered authenticated and the session can continue. If a one time password from the website server does not match a corresponding one time password computed by the mobile network device, then the session can be halted.

Figure 3:
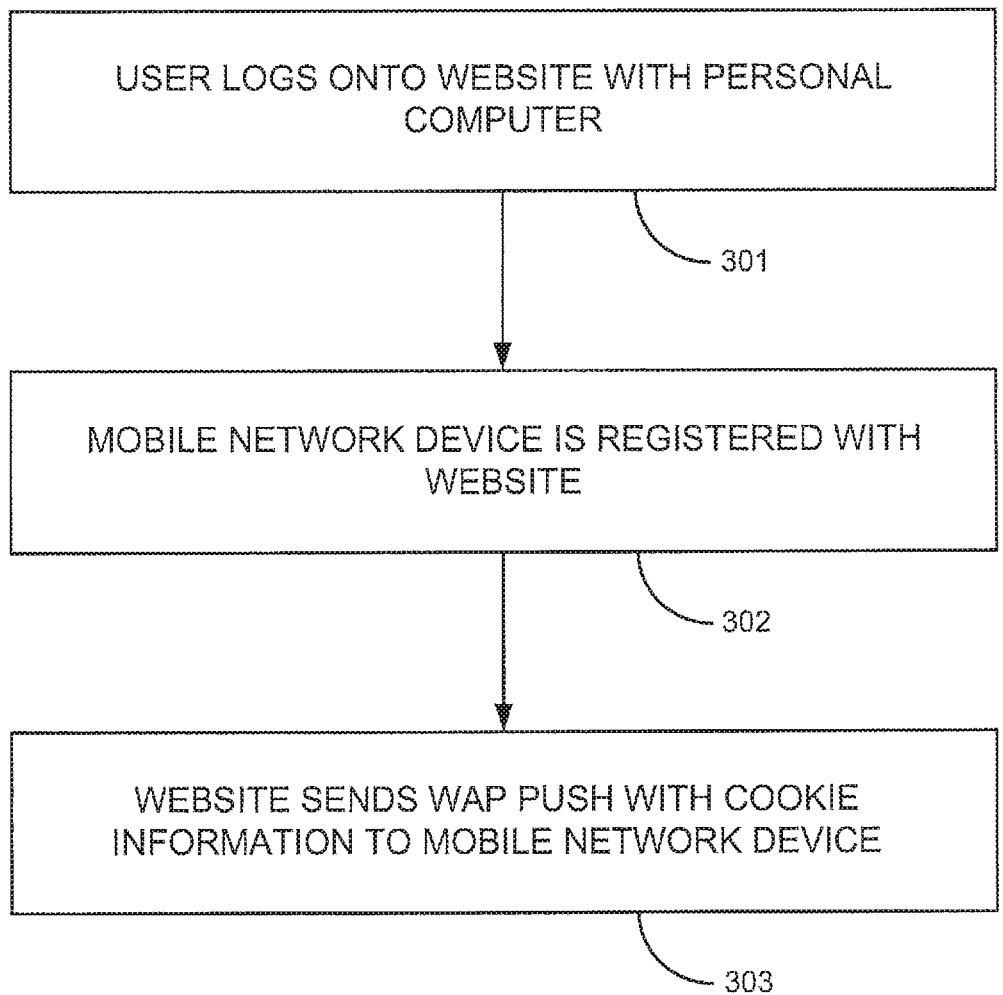
FIG. 3 is a flowchart showing initial seeding of the one time password computation software according to an example of an embodiment of the present invention.

Referring now to FIG. 3, an example of initially seeding the one time password computation software is shown. According to this example, a user logs onto a website with a personal computer (such as a desktop or laptop personal computer), as shown in block 301. The personal computer is generally a device other than the mobile network device which is being registered and which will subsequently be used to access the website. The mobile network device is registered with the website, as shown in block 302. The website then sends a wireless application protocol (WAP) push with cookie information to the mobile network device, as indicated in block 303. In this manner, the next time that a user visits the website, the one time password can be provided from the website to the user.

Accessing a website is the initial process of contacting and establishing communication with the website. Accessing a website occurs prior to logging onto the website. Logging onto a website includes an authentication process in which the user's authorization to gain further access to the website is verified. Authentication is typically accomplished by requiring the user to provide a logon identification or user name and a password.

Figure 4:
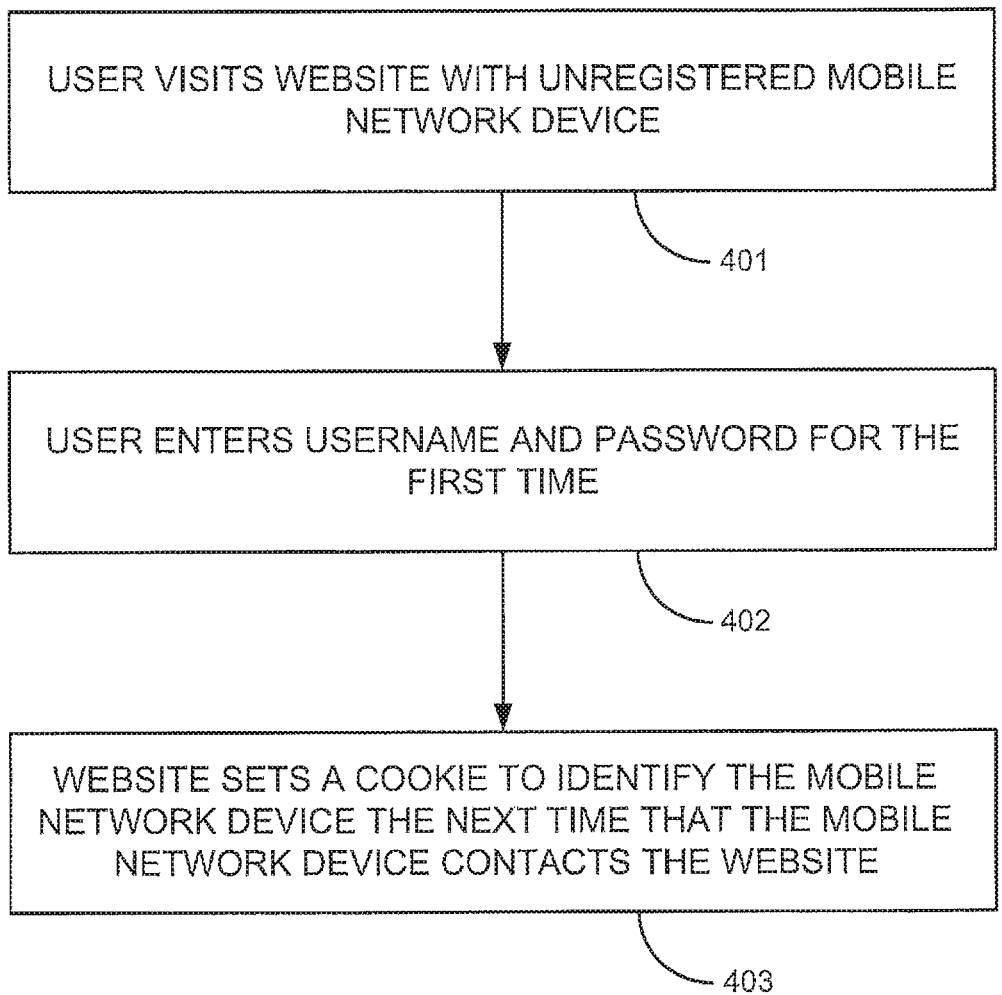
FIG. 4 is a flowchart showing initial seeding of the one time password computation software according to another example of an embodiment of the present invention.

Referring now to FIG. 4, another example of initially seeding the one time password computation software is shown. According to this example, a user visits a website with an unregistered mobile network device, as indicated in block 401. The user then enters a user name and password for the first time, as indicated in block 402. The website sets a cookie that is used to identify the mobile network device the next time that the mobile network device contacts the website, as indicated in block 403.

Figure 5:
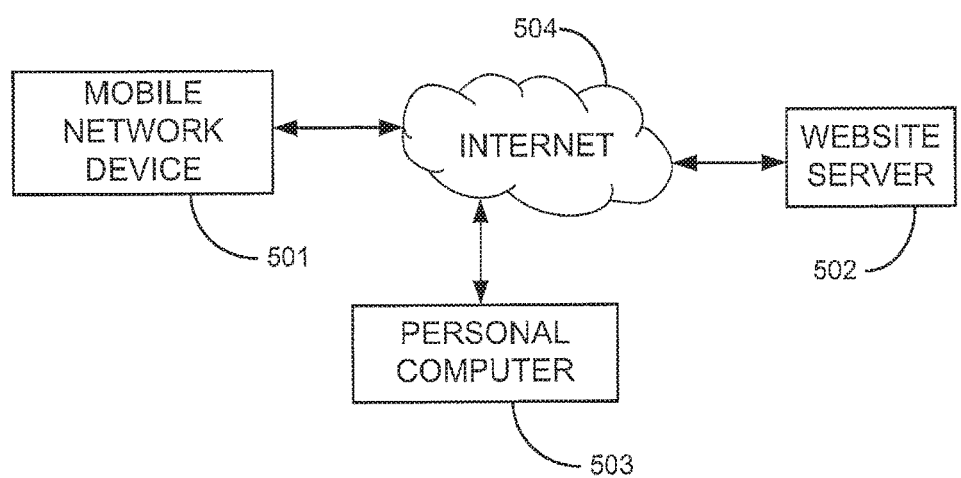
FIG. 5 is a block diagram showing communication of a mobile network device and a personal computer with a website server according to an example of an embodiment of the present invention.

Referring now to FIG. 5, a mobile network device 501 can communicate with a website server 502 via the Internet 504 to perform registration and/or website authentication and access as described with reference to FIGS. 1, 2, and 4 above. A personal computer 503 can communicate with the website server 502 via the Internet 504 to perform registration as described with reference to FIG. 3 above.

Examples of mobile network devices can include cellular telephones, personal digital assistants, tablet computers, laptop computers, and notebook computers. Mobile network devices can include any portable devices that facilitate access to a network, such as the Internet. Embodiments can be used with mobile network devices that do not display the URL of a website being access, as well as with mobile network device that do display this URL.

Software and/or hardware for one time password generation can be a secure software application of the telephone and thus need not be separately issued software and/or hardware. Thus, such software and/or hardware can be part of the mobile network device, such as part of the processor, firmware, and/or software thereof. Alternatively, such software and/or hardware can be added to the mobile network device by the user or by someone else.

By authenticating a website prior to providing the website with sensitive information, the user can be better assured that the sensitive information is being provided to a legitimate website. In this manner, phishing and the detrimental effects thereof can be mitigated.

The process described above can be reversed such that a client can be authenticated by a website. That is, a token generated by the website can be sent to the mobile network device and then one or more one time passwords can be generated by the mobile network device and communicated to the website so as to authenticate the mobile network device. Thus, both the website and the client can authenticate one another, if desired.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A mobile network device comprising:
a non-transitory memory storing passcode computation software; and
one or more hardware processors coupled to the non-transitory memory and configured to read the passcode computation software from the memory to cause the mobile network device to perform operations comprising:
generating, from a token, a first mobile network device passcode at a first time period during a computing session with a computing device;
receiving, from the computing device, a corresponding first computing device passcode for the first time period; and
extending the computing session in response to the corresponding first computing device passcode matching the first mobile network device passcode at the first time period.

2. The mobile network device of claim 1, the operations further comprising:
generating, from the token, a second mobile network device passcode at a second time period during the computing session, wherein the second mobile network device passcode is different from the first mobile network device passcode;
receiving, from the computing device, a corresponding second computing device passcode for the second time period; and
extending the computing session in response to the corresponding second computing device passcode matching the second mobile network device passcode at the second time period.

3. The mobile network device of claim 1, the operations further comprising:
halting the computing session in response to the corresponding first computing device passcode not matching the first mobile network device passcode at the first time period.

4. The mobile network device of claim 1, the operations further comprising:
receiving, prior to generating the first mobile network device passcode, a cookie from the computing device.

5. The mobile network device of claim 4, wherein the token comprises the cookie.

6. The mobile network device of claim 4, the operations further comprising:
generating the token from the cookie and information unique to the mobile network device.

7. The mobile network device of claim 1, the operations further comprising:
repeating the generating, receiving, and extending in response to matching according to a time period between one second and sixty seconds.

8. A method comprising:
establishing, by a processor of a mobile computing device, a computing session having a first time period with a computing device;
receiving, by the mobile computing device from the computing device, a first computing device passcode at a first time during the first time period;
matching, by the mobile computing device, the received first computing device passcode to a second computing device passcode generated from a token; and
extending the computing session to a second time period beyond the first time period in response to the matching.

9. The method of claim 8, further comprising:
receiving, by the mobile computing device from the computing device, a third computing device passcode during the second time period;
matching the received third computing device password to a fourth computing device password generated from the token; and
extending the computing session beyond the second time period in response to matching the received third computing device password to the fourth computing device password.

10. The method of claim 8, further comprising:
halting the computing session in response to the received first computing device passcode not matching the second computing device passcode during the first time period.

11. The method of claim 8, further comprising:
receiving, electronically by the mobile computing device, a cookie from the computing device.

12. The method of claim 11, wherein the token comprises the cookie.

13. The method of claim 11, wherein the token is generated from the cookie and information unique to the mobile computing device.

14. The method of claim 8, wherein the first time period is between one second and sixty seconds.

15. A non-transitory machine-readable medium having stored thereon machine-readable instructions executable to cause a machine to perform operations comprising:
generating, from a token, a first mobile network device passcode during a first time period of a computing session with a computing device;
receiving, from the computing device, a corresponding first computing device passcode before the computing session ends; and
extending the computing session beyond the first time period in response to the corresponding first computing device passcode matching the first mobile network device passcode.

16. The non-transitory machine-readable medium of claim 15, wherein the operations further comprise:
generating, from the token, a second mobile network device passcode during a second time period of the extended computing session, wherein the second mobile network device passcode is different from the first mobile network device passcode;
receiving, from the computing device, a corresponding second computing device passcode before the extended computing session ends; and
extending the extended computing session beyond the second time period in response to the corresponding second computing device passcode matching the second mobile network device passcode.

17. The non-transitory machine-readable medium of claim 15, wherein the operations further comprise:
halting the computing session after the first time period in response to the corresponding first computing device passcode not matching the first mobile network device passcode.

18. The non-transitory machine-readable medium of claim 15, wherein the operations further comprise:
receiving, prior to generating the first mobile network device passcode, a cookie from the computing device.

19. The non-transitory machine-readable medium of claim 18, wherein the operations further comprise:
   using the cookie as the token.

20. The non-transitory machine-readable medium of claim 18, wherein the operations further comprise:
   generating the token from the cookie and information unique to the machine.

* * * * *